(12) United States Patent
Gansner

(10) Patent No.: US 8,306,936 B2
(45) Date of Patent: Nov. 6, 2012

(54) AUTOMATED LEGAL EVALUATION USING BAYESIAN NETWORK OVER A COMMUNICATIONS NETWORK

(76) Inventor: Harvey L. Gansner, Smithers (CA)

( * ) Notice: Subject to any disclaimer, the term of this patent is extended or adjusted under 35 U.S.C. 154(b) by 8 days.

(21) Appl. No.: 13/029,504

(22) Filed: Feb. 17, 2011

(65) Prior Publication Data

US 2011/0231346 A1 Sep. 22, 2011

Related U.S. Application Data

(60) Provisional application No. 61/340,312, filed on Mar. 16, 2010.

(51) Int. Cl.
*G06F 17/00* (2006.01)
*G06N 5/00* (2006.01)
(52) U.S. Cl. ............... 706/45; 706/14; 706/46; 706/52; 706/62
(58) Field of Classification Search ............... None
See application file for complete search history.

(56) References Cited

U.S. PATENT DOCUMENTS

| | | | |
|---|---|---|---|
| 5,539,704 A | 7/1996 | Doyen | |
| 6,076,083 A | 6/2000 | Baker | |
| 6,336,108 B1 | 1/2002 | Thiesson | |
| 6,408,290 B1 * | 6/2002 | Thiesson et al. ............... | 706/52 |
| 6,456,622 B1 | 9/2002 | Skaanning | |
| 6,496,816 B1 | 12/2002 | Thiesson | |
| 6,529,891 B1 | 3/2003 | Heckerman | |
| 6,535,865 B1 | 3/2003 | Skaanning | |
| 6,687,685 B1 | 2/2004 | Sadeghi | |
| 6,807,537 B1 | 10/2004 | Thiesson | |
| 6,907,430 B2 | 6/2005 | Chong | |
| 7,003,158 B1 | 2/2006 | Bennett | |
| 7,251,636 B2 | 7/2007 | Chickering | |
| 7,650,272 B2 * | 1/2010 | Przytula et al. ............... | 703/20 |
| 7,783,582 B2 | 8/2010 | Doctor | |
| 2004/0220892 A1 | 11/2004 | Cohen | |
| 2005/0033712 A1 | 2/2005 | D'Ambrosio | |
| 2005/0091012 A1 * | 4/2005 | Przytula et al. ............... | 703/2 |
| 2005/0197992 A1 * | 9/2005 | Kipersztok et al. ............ | 706/50 |
| 2005/0210009 A1 * | 9/2005 | Tran ............................... | 707/3 |
| 2008/0027890 A1 | 1/2008 | Chickering | |
| 2009/0254475 A1 * | 10/2009 | Pennock et al. ............... | 705/39 |
| 2010/0082614 A1 | 4/2010 | Yang | |

OTHER PUBLICATIONS

Aleven, "USing background knowledge in case-based legal reasoning: A computational model an and intelligent learning envronment", Elsevier, 2003, pp. 183-237.*
Dawid, "Baye's Theorem and weighing evidence by juries" University College London, 2001, pp. 1-18.*
Huygen, "Use of Bayesian Belief Networks in legal reasoning", 17th BILETA Anual Conference, 2002, 14 pages.*

* cited by examiner

*Primary Examiner* — Omar Fernandez Rivas
(74) *Attorney, Agent, or Firm* — Mark Terry

(57) ABSTRACT

A method for legal knowledge modeling and automated legal evaluation, such as for online, questionnaire-based legal analysis, is provided. Information, such as facts and characteristics of a legal situation or legal scenario, as it relates to a legal conclusion or a legal result, in addition to the probabilities of such conclusions or results, are modeled in a Bayesian Network. The Bayesian Network may comprise instantiable nodes, fault nodes, intermediary nodes, a utility node and decision nodes. The Bayesian network is automatically updated on a periodic basis to reflect new legislation or court decisions. Using Bayesian inference, the conditional probability of a legal conclusion based on a user's answers to a questionnaire may be determined. These conditional probabilities are modified upon the input of evidence, which is typically in the form of answers to a dynamic set of questions designed to identify a legal conclusion or a legal result.

13 Claims, 3 Drawing Sheets

AUTOMATED LEGAL EVALUATION USING BAYESIAN NETWORK OVER A COMMUNICATIONS NETWORK

CROSS-REFERENCE TO RELATED APPLICATIONS

This patent application claims priority to provisional patent application No. 61/340,312 filed Mar. 16, 2010. The subject matter of provisional patent application No. 61/340,312 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION

1. Field of the Invention

The present invention relates to the field of legal analysis and, more specifically, the present invention relates to the field of automated legal analysis over a communications network.

2. Description of the Related Art

The evaluation of a legal case or a legal scenario can be a complex undertaking. There are often a myriad of state and federal laws and regulations, as well as judge-made law, which must be taken into account in order to reach a thorough and complete legal conclusion. Often, the facts surrounding the legal situation itself can be a difficult to understand and categorize. A criminal case involving forensic accounting, for example, may include the consideration of thousands of individual facts. The complexity of such an analysis is compounded by the fact that new legislation and court decisions are issued every day that can have an effect on the legal analysis being made. For example, the U.S. Board of Patent Appeals and Interferences at the U.S. Patent and Trademark Office issues ten to twenty decisions on any given work day, any of which can make a difference in a legal analysis involving patent law. In light of the above, it is no wonder that billions of dollars are expended every year in the U.S. in the course of evaluating legal situations.

Various approaches to the problems of complex legal analysis have been disclosed. The conventional approach utilized by the majority of the legal industry today involves the time-honored routine of having an attorney or team of attorneys and other legal professionals amass all relevant facts associated with a legal scenario, conduct legal research into all relevant laws, regulations and court decisions, and write legal memorandums to explore each legal issue separately. After all of the facts have been pored over and all applicable laws have been evaluated in light of the facts, the attorney(s) generate a theory of the case, which is typically asserted in a final legal memorandum. Other than using computers to perform the tasks above, the aforementioned conventional system of legal analysis has not changed in more than a century. As a result, when a prospective client walks into a modern lawyer's office and requests an evaluation of his case, it can often take weeks or months and many thousands of dollars until such an evaluation is complete.

One popular automated approach, often employed by vendors of tools to legal providers, involves the use of an inference engine. Modern inference engines in the legal industry typically involve sets of if-then rules that are executed to reach a legal conclusion or evaluation. The user of the inference engine begins by entering the facts of the case, often as answers to questions posed to the user, into a computer interface that reads the entries. Any if-then statements that match the given facts are executed, the result of which is a legal conclusion or final legal evaluation.

The approaches above, however, have their drawbacks. One problem with the conventional approach is its limited usability by a single user. Due to the sheer magnitude of laws, regulations and facts surrounding certain complex cases, it is simply not possible for a single attorney or other legal professional to absorb all of the applicable data and make a sound legal conclusion. Thus, in complex cases, teams of legal professionals must be employed to accomplish the task. This can be extremely costly and time intensive. Another problem with the conventional approach is user error. Since humans cannot perform at 100% accuracy for extended periods of time, there is the risk that the evaluation of hundreds of laws, regulations and court decisions may include mistakes that affect the accuracy of the final legal conclusion of the legal professional. This is an unacceptable risk in cases where large amounts of money or the freedom of the client is at stake. Finally, legal professionals are subject to their own biases, due to the party represented (plaintiff or defendant), gender, race, etc. This can cloud a legal professional's judgment and affect the accuracy of his or her legal evaluation.

One problem with both the conventional approach and the inference engine approach is the lack of the ability to account for probabilities in legal evaluations. An inference engine using if-then statements, for example, reaches a hard and fast conclusion or result. That is, the result may be a "yes" or "no." In the legal world, however, guarantees of a win or loss in any given case are rarely given, since the final decision maker is a person or persons—i.e., a judge, board or jury—and decisions can vary widely. For this reason, probabilities would be a more accurate method for presenting a legal analysis. Further, the approaches above do not provide a mechanism for showing or explaining the relationships between the given facts of the case and the legal conclusions or analysis. Thus, this limits the ability of the aforementioned approaches to educate the user on how various aspects of the legal scenario interact with each other. Lastly, the approaches above do not adequately account for the fast paced issuance of new laws, regulations and court decisions that could affect the result of a legal evaluation. This brings into question the validity of any legal conclusion reached by a system that does not take the most recent laws into account.

Therefore, what is needed is a system and method for improving the problems with the prior art, and more particularly for a more efficient method and system for evaluating legal situations and scenarios.

BRIEF SUMMARY OF THE INVENTION

Embodiments of the present invention address deficiencies of the art in respect to automated legal analysis and provide a novel and non-obvious method, computer and computer program product for aiding in the analysis of a legal matter using a Bayesian network. In an embodiment of the invention, the steps performed by the method, server and computer program product of the present invention include:

(a) generating a Bayesian network representing probabilistic relationships between a plurality of legal inquiries and a plurality of legal conclusions, wherein the Bayesian network comprises a plurality of nodes and a plurality of edges connecting the nodes, wherein each node is associated with a variable that represents either an answer to a legal inquiry or a legal conclusion, and an edge represents a conditional dependency between variables of nodes;

(b) associating a probability function with each node, wherein a probability function takes as input one or more values of variables from one or more parent nodes and gives a probability of a child node's variable;

(c) providing to a user, via a graphical user interface, the plurality of legal inquiries;

(d) receiving from the user, via the graphical user interface, answers to at least a portion of the legal inquiries;

(e) replacing a variable of each node corresponding to an answer provided by the user with a value representing the answer;

(f) executing the probability function of each node, thereby calculating the probability of each legal conclusion based on the answers provided by the user;

(g) displaying for the user, via the graphical user interface, the probability of each legal conclusion;

(h) storing a record associated with the user, the probability of each legal conclusion, as displayed for the user, the plurality of legal inquiries and the plurality of legal conclusions;

(i) receiving a legal update comprising a change in law that affects how the legal conclusions are reached;

(j) modifying the Bayesian network in light of the legal update;

(k) replacing a variable of each node in the modified Bayesian network corresponding to an answer provided by the user with a value representing the answer;

(l) executing the probability function of each node in the modified Bayesian network, thereby re-calculating the probability of each legal conclusion based on the answers provided by the user; and (m) wherein if the probability of each legal conclusion in the modified Bayesian network does not match the probability of each legal conclusion in the record that was stored, sending a message to the user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention improves upon the problems with the prior art by providing a more effective and efficient automated method and system for providing quick and simple legal analysis using probabilities of legal conclusions or results. The present invention improves over the prior art by increasing usability by a single user, even in complex legal cases that involve large amounts of facts and numerous laws or regulations. This feature saves time and expenses by providing an empirical data-based legal conclusion in a short period of time. The present invention also improves upon the prior art by providing higher accuracy in the legal evaluation. Due to its automated nature, the present invention does not rely on a human to make legal analysis decisions, thereby reducing or eliminating the risk of making a mistake in the course of evaluating large numbers of facts, laws, regulations and court decisions. Further, the automated nature of the present invention removes the natural bias of a legal professional in the legal analysis process, thereby providing for a more accurate legal conclusion.

The present invention further improves upon the conventional approach and the inference engine approach by providing the ability to account for probabilities in legal evaluations. This is advantageous since probabilities are a more practical and understandable method for presenting a legal analysis. Further, the present invention provides a mechanism for showing or explaining the relationships between the given facts of the case and the legal conclusions or analysis, thereby providing an educational benefit to the user. Lastly, the present invention adequately accounts for the fast paced issuance of new laws, regulations and court decisions that could affect the result of a legal evaluation. The periodic update feature of the present invention provides an automated mechanism for updating legal conclusions based on new legal updates and even notifying the user if a legal conclusion has changed in light of the legal update.

Figure 1:
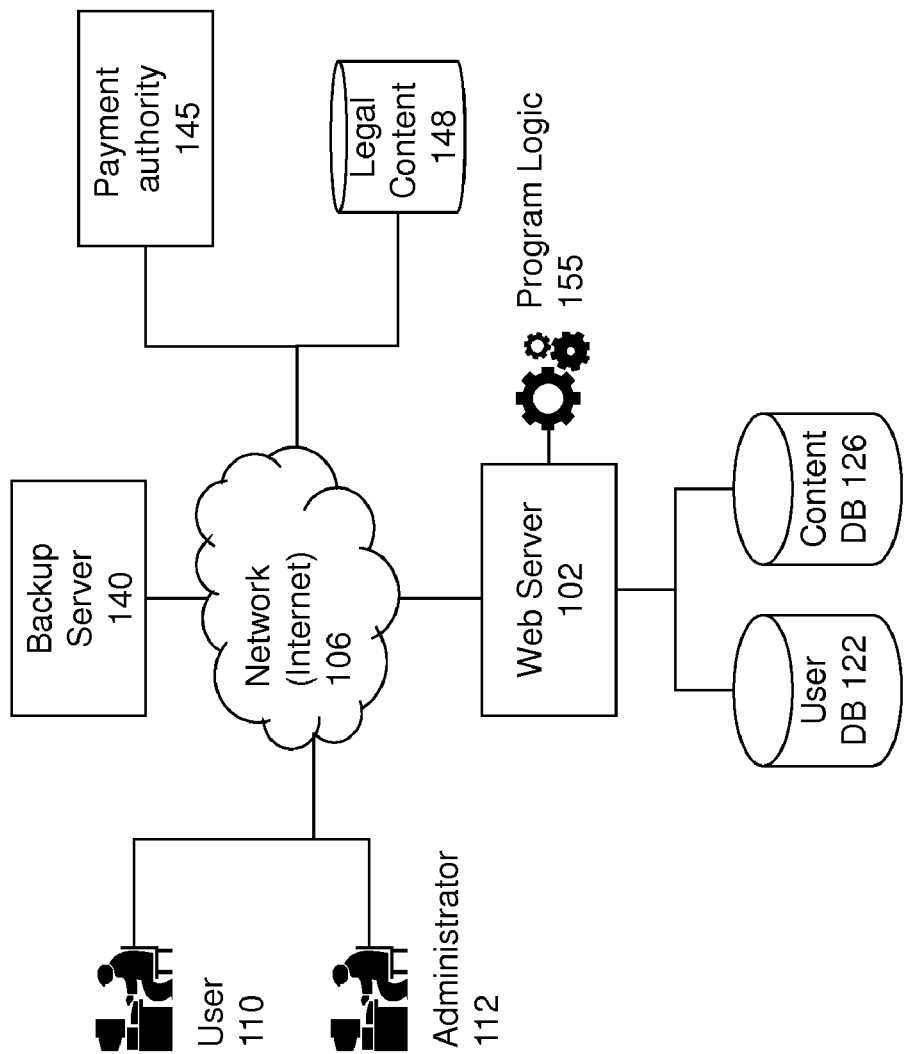
FIG. 1 is a block diagram illustrating the network architecture of a system for aiding in the analysis of a legal matter using a Bayesian network over a communications network, in accordance with one embodiment of the present invention.

Referring now to the drawing figures in which like reference designators refer to like elements, there is shown in FIG. 1 a block diagram illustrating the network architecture of a system for aiding in the analysis of a legal matter using a Bayesian network over a communications network, in accordance with one embodiment of the present invention. FIG. 1 shows an embodiment of the present invention wherein users 110-112, each comprising an individual and a computer, interact with server 102 over a network 106, which can be a packet switched network such as the Internet or the World Wide Web. The computer of users 110-112 can be a desktop, a laptop, handheld computer, a smart phone, a tablet computer or the like.

Server 102, which may be a web server, is the main operative element of the present invention, executing the steps that comprise the method of the present invention. Server 102 includes a software engine that delivers applications and data content (including text files, HTML files, music files, video files, electronic book files, app files, information files, and any other media content) to users 110-112. Server 102 may also deliver data content to users 110-112 based on search parameters or identifying information selected by a client. It should be noted that although FIG. 1 shows only two users 110-112 and one server 102, the system of the present invention supports any number of client users and web servers connected via network 106.

Server 102 includes program logic 155 comprising computer source code, scripting language code or interpreted language code that is compiled to produce computer instructions that perform various functions of the present invention. In one embodiment of the present invention, the program logic is a scripting language. Program logic 155 may reside on a client computer, the server 102 or any combination of the two.

FIG. 1 further shows that server 102 is connected to a user record database 122 and a legal content database 126. Database 122 is used to store user records, such as profiles and other user account data, which have been created for each user 110-112. Database 126 stores all legal data content of the present invention. Databases 122 and 126 are collectively referred to as the "data repository" or the "central repository" for all resident data served by server 102 in the present invention. Note that although FIG. 1 shows only two databases 122 and 126, the present invention supports any number of databases holding various types of data that is served by server 102.

FIG. 1 also shows a payment authority 145 to effectuate payments by users 110-112 for legal data content. In one embodiment of the present invention, the payment authority 145 is a payment gateway that authorizes payments and transfers funds from one entity, the buyer, to another, the seller. Payment gateways accept payment via the use of credit cards, charge cards, bank cards, gift cards, account cards, etc.

FIG. 1 also shows a third party legal data content provider 148, which provides updates on legal data content. Lastly, FIG. 1 shows a backup server 140 which makes copies of data on server 102 and/or its associated databases 122 and 126, so that these additional copies may be used to restore the original after a data loss event. The backup server 140 may be used to restore a state following a disaster or to restore small numbers of files after they have been accidentally deleted or corrupted.

Note that although server 102 is shown as a single and independent entity, in one embodiment of the present invention, the functions of server 102 may be integrated with the functions of another entity, such as entities 140, 145, and 148 of FIG. 1. Further server 102 and its functionality, according to a preferred embodiment of the present invention, can be realized in a centralized fashion in one computer system, or in a distributed fashion where different elements are spread across several interconnected computer systems.

Figure 2:
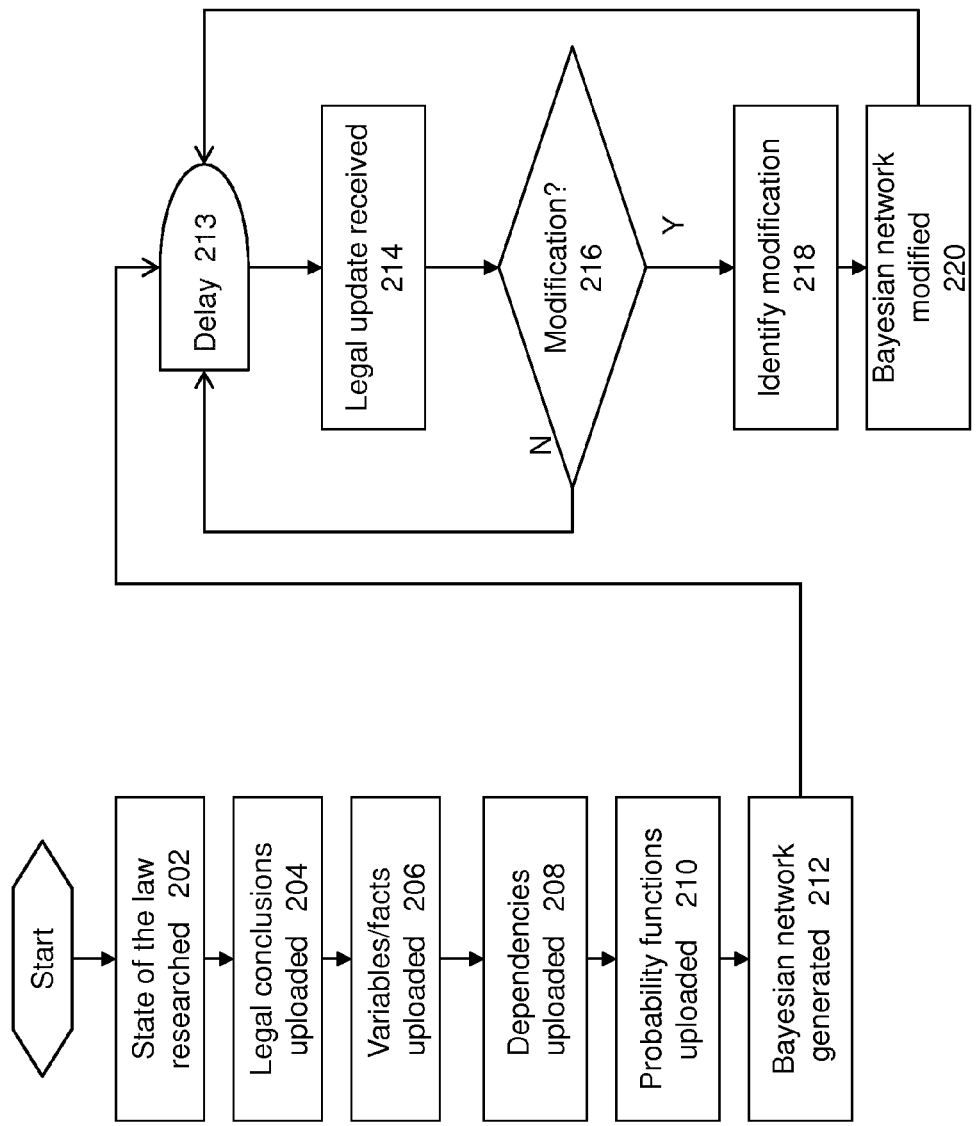
FIG. 2 is a flow chart describing the control flow of the process for setting up and updating the Bayesian network of FIG. 1 over a communications network, in accordance with one embodiment of the present invention.

FIG. 2 is a flow chart describing the control flow of the process for setting up and updating the Bayesian network of FIG. 1 over a communications network (i.e., network 106), in accordance with one embodiment of the present invention. The flow chart of FIG. 2 describes the process undertaken during the setup of the Bayesian network by the administrator 112, as well as the periodic updating of the network. The flow chart of FIG. 2 is described in association with FIG. 1.

For exemplary purposes, a running example shall be used involving a legal query into the constitutionality or propriety of a criminal drug-related arrest of a legal client. In a first step 202, an administrator or legal professional 112 reads or otherwise consults with the latest state of the law on a particular subject—in this case, drug-related criminal arrests. The administrator 112 may consult, for example, federal and state statutes, regulations, rules, treaties, laws, court decisions, administrative decisions, legal opinions from non-governmental authorities and the like. This step may comprise downloading or accessing legal information from a legal content provider 148 in exchange for a fee using payment authority 145. The legal content downloaded from 145 may be stored in database 126.

Based on the current state of the law on this subject, in step 204 the administrator 112 generates and uploads a set of legal conclusions to server 102. In this example, the legal conclusions may include: a) the arrest violated the constitutional rights of the client and b) the arrest did not violate the client's constitutional rights, i.e., it is constitutional. In one alternative to the upload of legal conclusions, the administrator may upload other outcomes, such as guidance, possible courses of action, possible legal consequences, relevant and applicable case law, relevant and applicable statutes, samples of correspondence that the user may need to complete in order to pursue a particular course of action, and electronic hyperlinks to other relevant or helpful websites of any kind. That is, the administrator may upload data and educational information that is displayed for the user after he has undergone the data input process of 302-306 below.

In step 206, the administrator 112 generates and uploads a set of variables representing facts relevant to the legal conclusions of step 204. In this example, the variables representing facts may include: 1) whether the drug at issue was regulated by federal law, 2) whether the law enforcement officer had probable cause to arrest the client, and 3) whether the requisite amount of the drug at issue was found on the client's person.

In step 208, the administrator 112 generates and uploads a description of dependencies between the facts of step 206 and between facts and the conclusions of step 204. For example, the administrator may specify that the conclusion of whether the arrest violated the constitutional rights of the client is dependent on the facts 1), 2) and 3) above—i.e., the question of whether the arrest violated the constitutional rights of the client is dependent on whether the drug was regulated by federal law, whether the law enforcement officer had probable cause to arrest the client and whether the requisite amount of the drug was found on the client's person.

In step 210, the administrator 112 generates and uploads probability functions for the conclusions of step 204. A probability function takes as input one or more values of variables from one or more facts on which the legal conclusion depends. Based on the values of those variables, the probability function provides a probability that the legal conclusion is true. For example, the administrator may specify a probability function dictating that the probability the arrest did not violate the constitutional rights of the client is 70% if the facts showed only that the drug was regulated by federal law and the law enforcement officer had probable cause to arrest the client. The same probability function, however, may dictate that the probability the arrest did not violate the constitutional rights of the client is only 20% if the facts showed only that the requisite amount of the drug was found on the client's person.

The probability functions of step 210 may represent empirical data garnered from legal authorities, such as courts of law. In one embodiment of the present invention, the probability functions of step 210 may represent the probabilities of certain legal outcomes, as shown by empirical data pertaining to court judgments, jury decisions, judge decisions, board decisions, etc. that relate to the same legal issues and facts entered in steps 202-206. Further, the probability functions of step 210 may be specific to certain judges or judge panels, such that the probabilities of certain legal outcomes may be reviewed according to the identity of the judge or judges presiding over a case. The legal facts, conclusions, dependencies and probability functions of steps 204-210 may be stored in database 126.

In one alternative to a probability function, in step 210, the administrator provides other program logic for generating a legal conclusion or decision based on one or more values of variables from one or more facts. For example, the administrator may input decision tree reasoning, simple predicate logic, or other suitable AI techniques. A decision tree is a decision support tool that uses a tree-like graph or model of decisions and their possible consequences, including chance event outcomes, resource costs, and utility. Predicate logic is the generic term for symbolic formal systems like first-order logic, second-order logic, many-sorted logic or infinitary logic.

In step 212, the program logic 155 of server 102 generates a Bayesian network representing probabilistic relationships between variables representing facts and a plurality of legal conclusions. The Bayesian network of step 212 is based on the legal conclusions, variables, dependencies, and probability functions defined in steps 204-210. Step 212 includes generating a node for each legal conclusion of step 204 and a node for each set of variables representing facts (of step 206) relevant to the legal conclusions. Step 212 further includes inserting edges between nodes, wherein an edge represents a conditional dependency between variables of nodes, as those dependencies are defined in step 208. Lastly, the probability functions defined in step 210 are entered in each node representing a legal conclusion.

A Bayesian Network may comprise, and the present invention may generate, via step 212, instantiable nodes, fault nodes, intermediary nodes, a utility node and a decision node. Instantiable nodes are nodes into which evidence is entered. Usually, they will correspond to questions with discrete or continuous input that are instantiated by the user; i.e., evidence "observed" by the user will be entered to the network at these nodes. Fault nodes are output nodes, the results of which are of interest to the user. Decisions and the information sought to be provided by the network are modeled in these nodes. These nodes are not instantiated. They are monitored for answers that are needed. In a network, there can be more than one fault node, and as a result, fault nodes may be interpreted in conjunction or separately. For example, one fault node could provide the legal conclusion level, and another fault node could provide the overall legal status of the client. Intermediary nodes are neither instantiated nor monitored or faulted. Their purpose is grouping and at times simplifying the overall network design. Utility nodes provide the quantitative background for a decision node to make a decision. The utility node comprises a table of values representing utilities for various decisions given a state in the chief complaint fault node. A decision node calculates a utility value for all states in the decision node. To do this, the decision node uses a table of corresponding utility values for all states in the chief complaint fault node.

Decision nodes are fault nodes. The decision node will have different decisions as its states. At any given time based on probabilities for different states in the diagnosis fault node and table of utilities in the utility node a utility value will be calculated for all states of the decision node. Utilities are provided such that the state with greatest utility will be considered the best decision. Decisions could be of any nature. Examples include a legal situation where the goal would be to find out if the client's legal rights have been violated.

In step 213, a period of time passes. In step 214, a legal update is received by server 102. A legal update may comprise new legislation, laws or regulations or a new court or administrative decision. In step 216 it is determined whether the Bayesian network necessitates modification in light of the legal update. In one embodiment, step 216 may be performed automatically by program logic 155 and in another embodiment, step 216 may be performed with the assistance of an administrator 112, wherein the administrator reviews the legal update and provides instructs the server 102 as to whether the Bayesian network must be defined. If the network must be modified, control flows to step 218. Otherwise, control flows back to step 213.

In step 218, it is determined how the Bayesian network must be modified in light of the legal update. In one embodiment, step 218 may be performed automatically wherein the program logic 155: a) automatically identifies which of the nodes, edges, probability functions, facts or plurality of legal conclusions should be deleted, b) automatically identifies how one or more nodes, edges, probability functions, facts or plurality of legal conclusions should be modified and c) automatically identifies which nodes, edges, probability functions, facts or legal conclusions should be added to the Bayesian network. In another embodiment, step 218 may be performed with the assistance of an administrator 112, wherein the administrator reviews the legal update and provides a description to the server 102 of whether nodes, edges, probability functions, facts or legal conclusions should be deleted, modified or added.

In step 220, the Bayesian network is modified as defined in step 218. In one embodiment, the modification is performed automatically by program logic 155. In another embodiment, the modification is performed with the assistance of administrator 112. In this embodiment, the items identified in step 218 are presented to the administrator via a graphical user interface so that the administrator may review the items and decide how to modify the Bayesian network. Subsequently, the administrator may manually modify the nodes, edges, probability functions, facts or plurality of legal conclusions of the Bayesian network. Control then flows back to step 213.

Figure 3:
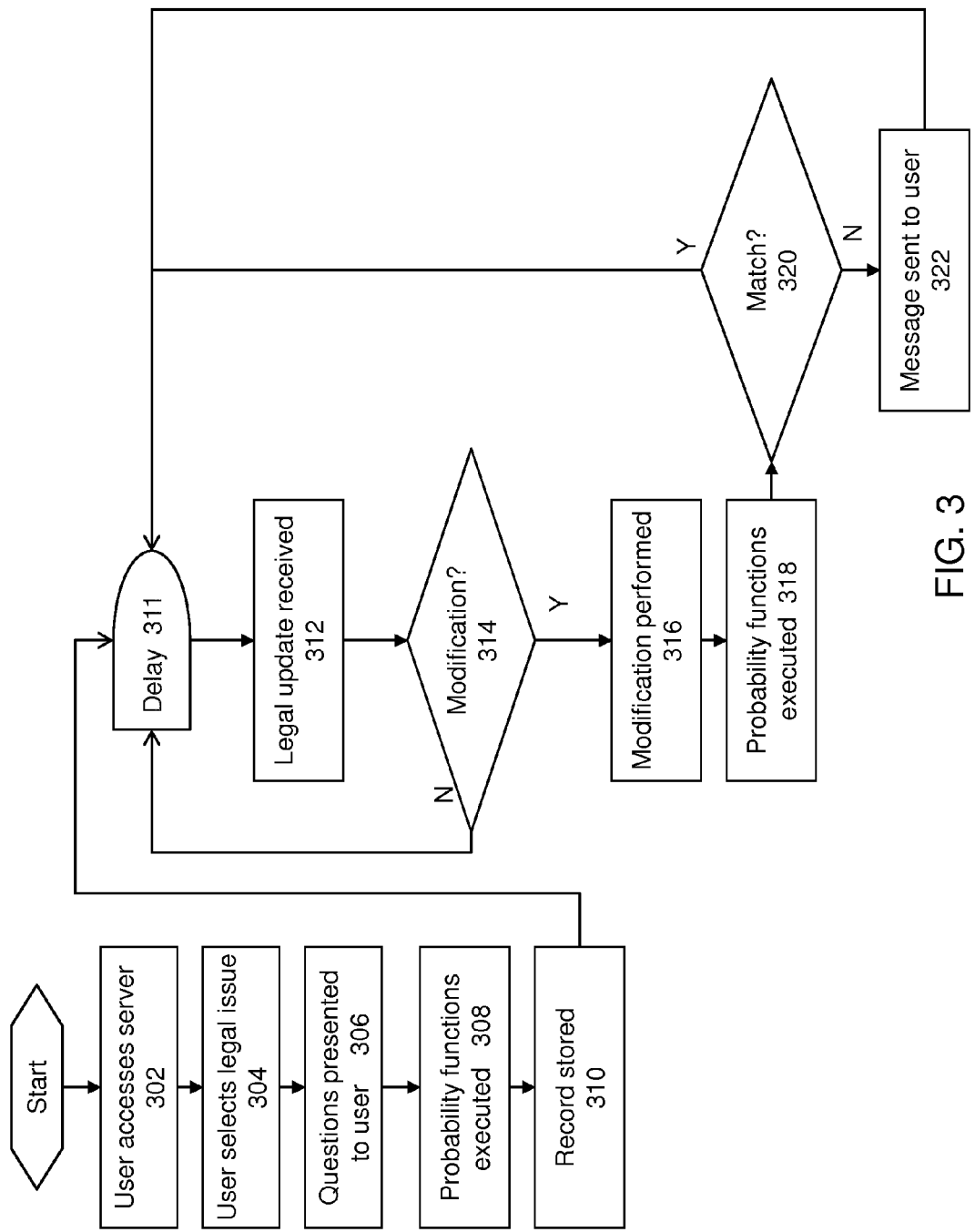
FIG. 3 is a flow chart describing the control flow of the process for executing the Bayesian network of FIG. 1 over a communications network, in accordance with one embodiment of the present invention.

FIG. 3 is a flow chart describing the control flow of the process for executing the Bayesian network of FIG. 1 over a communications network, in accordance with one embodiment of the present invention. The flow chart of FIG. 3 describes the process undertaken during the use of the Bayesian network by a user 110 over the network 106. The flow chart of FIG. 3 is described in association with FIG. 1. The running example involving the legal query into the constitutionality of a drug-related arrest of a legal client will continue to be used herein.

In step 302, the user 110 accesses the web server 102 over the network 106. In step 304, the user 110 identifies the legal issue he would like to analyze. The user 110 may provide a search parameter to server 102, which may respond with a list of legal issues from which user 110 may select. For example, the user 110 may specify "drug-related arrests" as his legal topic of choice. Based on this selection, the program logic 155 accesses the Bayesian network corresponding to the legal issue identified by the user 110. In step 306 the user 110 is presented with a graphical user interface that displays a series of legal inquiries, each corresponding to a legal fact of step 206. For example, the user 110 may be presented with questions such as: 1) Was the drug at issue a Schedule 1 drug such as heroin? 2) Was the drug at issue found by a police officer on your person? 3) How much of the drug at issue was found on your person? Subsequently, the user 110 provides his answers to the legal inquiries via the graphical user interface.

In step 308, program logic 155 executes the probability functions of the Bayesian network based on the answers provided by the user 110. That is, the variable of each node corresponding to an answer provided by the user 110 is replaced with a value representing the answer. Subsequently, the probability functions of each node are executed, thereby calculating the probability of each legal conclusion based on the answers provided by the user 110 in step 306. In step 310, the graphical user interface displays the probability of each legal conclusion to user 110.

In one alternative to the display of legal conclusions, in step 310 the interface may display guidance, possible courses of action, possible legal consequences, relevant and applicable case law, relevant and applicable statutes, samples of correspondence that the user may need to complete in order to pursue a particular course of action, and electronic hyperlinks to other relevant or helpful websites of any kind.

Also in step 310, a record associated with the user 110 is stored in database 122. The record may also be associated with the probability of each legal conclusion, as displayed for the user 110, the plurality of legal inquiries, the answers provided by the user and the plurality of legal conclusions. In step 311, a period of time passes. In step 312, a legal update is received. In step 314 (which may be executed in the same manner as step 216), it is determined whether the legal update comprises a change in law affecting how the legal conclusions are reached. If the legal update comprises a change in law, then control flows to step 316. Otherwise control flows back to step 311.

In step 316, the Bayesian network is modified in light of the legal update. See steps 218-220 above for a description of how the Bayesian network can be modified. In step 318, previous step 308 is re-executed. That is, the modified Bayesian network is executed using the answers provided by the user 110, thereby re-calculating the probability of each legal conclusion based on the answers provided by the user. In step 320, it is determined whether the probability of each legal conclusion in the modified Bayesian network matches the probability of each legal conclusion in the record that was stored in step 310. If there is a match, then control flows back to step 311. If there is no match, then a message, such as an email message, is sent to the user 110 in step 322, notifying him of the discrepancy.

In addition to the implementations described above with relation to automated legal analysis, the present invention can also be used in other decision-making capacities, such as medical diagnosis, evaluation of infrastructures via an engineering inspection, network health analysis and building code compliance. In other embodiments, the present invention may be used as an educational tool that highlights the most pertinent aspects of a decision-making process.

The present invention can be realized in hardware, software, or a combination of hardware and software in the system described in the figures above. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, disk drive memory, CD-ROM, and other permanent storage. Additionally, a computer readable medium may include, for example, volatile storage such as RAM, buffers, cache memory, and network circuits.

In this document, the terms "computer program medium," "computer usable medium," and "computer readable medium" are used to generally refer to media such as main memory removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A method on a computer for aiding in the analysis of a legal matter using a Bayesian network, comprising:

generating a Bayesian network representing probabilistic relationships between a plurality of legal inquiries and a plurality of legal conclusions, wherein the Bayesian network comprises a plurality of nodes and a plurality of edges connecting the nodes, wherein each node is associated with a variable that represents either an answer to a legal inquiry or a legal conclusion, and an edge represents a conditional dependency between variables of nodes;

associating a probability function with each node, wherein a probability function takes as input one or more values of variables from one or more parent nodes and gives a probability of a child node's variable;

providing to a user, via a graphical user interface, the plurality of legal inquiries;

receiving from the user, via the graphical user interface, answers to at least a portion of the legal inquiries;

replacing a variable of each node corresponding to an answer provided by the user with a value representing the answer;

executing the probability function of each node, thereby calculating the probability of each legal conclusion based on the answers provided by the user;

displaying for the user, via the graphical user interface, the probability of each legal conclusion;

storing a record associated with the user, the probability of each legal conclusion, as displayed for the user, the plurality of legal inquiries and the plurality of legal conclusions;

receiving a legal update comprising a change in law that affects how the legal conclusions are reached;

modifying the Bayesian network in light of the legal update;

replacing a variable of each node in the modified Bayesian network corresponding to an answer provided by the user with a value representing the answer;

executing the probability function of each node in the modified Bayesian network, thereby re-calculating the probability of each legal conclusion based on the answers provided by the user; and wherein if the probability of each legal conclusion in the modified Bayesian network does not match the probability of each legal conclusion in the record that was stored, sending a message to the user.

2. The method of claim 1, wherein the step of providing to a user the plurality of legal inquiries comprises:

providing to a remote user, over a communication network via a graphical user interface, the plurality of legal inquiries.

3. The method of claim 2, wherein the step of receiving from the user answers to at least a portion of the legal inquiries: comprises:

receiving from the remote user, over a communication network via the graphical user interface, answers to at least a portion of the legal inquiries.

4. The method of claim 3, wherein the step of displaying for the user the probability of each legal conclusion comprises:

displaying for the remote user, over a communication network via the graphical user interface, the probability of each legal conclusion.

5. The method of claim 4, wherein the step of sending a message to the user comprises:

generating and sending an email to the user specifying that probability of the legal conclusion previously provided to the user has changed.

6. The method of claim 4, wherein the step of sending a message to the user comprises:

generating a sending a text message to the user specifying that probability of the legal conclusion previously provided to the user has changed.

7. The method of claim 1, wherein the step of receiving a legal update comprises:

receiving an automated legal update over a communication network.

8. A method on a computer for generating and periodically updating a Bayesian network used in aiding in the analysis of a legal matter, comprising:

generating a Bayesian network representing probabilistic relationships between a plurality of legal inquiries and a plurality of legal conclusions, wherein the Bayesian network comprises a plurality of nodes and a plurality of edges connecting the nodes, wherein each node is associated with a variable that represents either an answer to a legal inquiry or a legal conclusion, and an edge represents a conditional dependency between variables of nodes;

associating a probability function with each node, wherein a probability function takes as input one or more values of variables from one or more parent nodes and gives a probability of a child node's variable;

receiving a legal update comprising a change in law that affects how the legal conclusions are reached;

automatically identifying which legal inquiries or legal conclusions must be modified in light of the legal update;

displaying for a user, via a graphical user interface, the legal inquiries or legal conclusions that were identified to be modified;

receiving from the user, via the graphical user interface, a description of modifications to the Bayesian network that must be performed in light of the legal update; and modifying the Bayesian network as described by the user.

9. The method of claim 8, wherein the step of receiving a legal update comprises:

receiving an automated legal update over a communication network.

10. The method of claim 8, wherein the step of displaying for the user the legal inquiries or legal conclusions comprises:

displaying for the remote user, over a communication network via a graphical user interface, the legal inquiries or legal conclusions that were identified to be modified.

11. The method of claim 8, wherein the step of receiving from the user a description of modifications comprises:

receiving from the remote user, over a communication network via the graphical user interface, a description of modifications to the Bayesian network that must be performed in light of the legal update.

12. The method of claim 8, wherein the description of modifications to the Bayesian network comprises one or more of:

an identification of which of the nodes, edges, probability functions, plurality of legal inquiries or plurality of legal conclusions should be deleted;

an identification of how one or more nodes, edges, probability functions, plurality of legal inquiries or plurality of legal conclusions should be modified; and an identification of which nodes, edges, probability functions, legal inquiries or legal conclusions should be added to the Bayesian network.

13. The method of claim 8, further comprising:

replacing a variable of each node in the modified Bayesian network corresponding to an answer provided by the user with a value representing an answer provided by a user;

executing the probability function of each node in the modified Bayesian network, thereby calculating the probability of each legal conclusion based on the answers provided by the user; and wherein if the probability of each legal conclusion in the modified Bayesian network does not match the probability of each legal conclusion in a previously stored record associated with the user, sending a message to the user.

* * * * *